US011864086B2

United States Patent
Ohlsson et al.

(10) Patent No.: US 11,864,086 B2
(45) Date of Patent: Jan. 2, 2024

(54) RADIO NETWORK AREA UPDATE IN A WIRELESS COMMUNICATION SYSTEM

(71) Applicant: Telefonaktiebolaget LM Ericsson (publ), Stockholm (SE)

(72) Inventors: Oscar Ohlsson, Stockholm (SE); Icaro L. J. Da Silva, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 328 days.

(21) Appl. No.: 17/287,158

(22) PCT Filed: Oct. 31, 2019

(86) PCT No.: PCT/SE2019/051102
§ 371 (c)(1),
(2) Date: Apr. 21, 2021

(87) PCT Pub. No.: WO2020/091684
PCT Pub. Date: May 7, 2020

(65) Prior Publication Data
US 2021/0385727 A1 Dec. 9, 2021

Related U.S. Application Data

(60) Provisional application No. 62/754,507, filed on Nov. 1, 2018.

(51) Int. Cl.
*H04W 48/02* (2009.01)
*H04W 76/27* (2018.01)
(52) U.S. Cl.
CPC .......... *H04W 48/02* (2013.01); *H04W 76/27* (2018.02)
(58) Field of Classification Search
CPC ..... H04W 48/02; H04W 48/04; H04W 48/06; H04W 76/20; H04W 76/27; H04W 76/28; H04W 76/30
See application file for complete search history.

(56) References Cited

U.S. PATENT DOCUMENTS 11,212,864 B2 * 12/2021 Wang .................... H04W 60/00
2013/0310035 A1 * 11/2013 Gouriou .............. H04W 60/005
455/435.1

(Continued)

FOREIGN PATENT DOCUMENTS

WO 2018174483 A1 9/2018

OTHER PUBLICATIONS

International Search Report and Written Opinion dated Jan. 30, 2020 for International Application No. PCT/SE2019/051102 filed Oct. 31, 2019, consisting of 10-pages.
3GPP TSG-RAN WG2 Meeting #103; Title: Chair Notes; Source: RAN2 Chairman (Intel); Date and Location: Aug. 20-24, 2018, Gothenburg, Sweden, consisting of 135-pages.
3GPP TSG-CT WG1 Meeting #82bis C1-131375; Title: Tracking Area Update condition due to local EPS bearer deactivation; Source to WG: Samsung; Source to TSG: C1; Work item Code: SAES3; Date and Location: Apr. 8-12, 2013, San Diego, USA, consisting of 8-pages.

(Continued)

*Primary Examiner* — Jean A Gelin
(74) *Attorney, Agent, or Firm* — Christopher & Weisberg, P.A.

(57) ABSTRACT

A wireless device is configured for controlling radio network area, RNA, update. The wireless device in particular is configured to enter an out-of-coverage state while the wireless device is in a radio resource control, RRC, inactive state. Responsive to access barring for an access category of the wireless device being alleviated while the wireless device is in the out-of-coverage state, the wireless device is configured to cancel or postpone a pending RNA update.

18 Claims, 18 Drawing Sheets

(56) References Cited

U.S. PATENT DOCUMENTS

| | | | | |
|---|---|---|---|---|
| 2014/0038601 | A1* | 2/2014 | Gouriou | H04W 8/183 |
| | | | | 455/435.1 |
| 2018/0110060 | A1* | 4/2018 | Huang | H04W 72/21 |
| 2018/0220486 | A1* | 8/2018 | Tseng | H04W 36/305 |
| 2018/0270713 | A1* | 9/2018 | Park | H04L 5/0053 |
| 2018/0270895 | A1* | 9/2018 | Park | H04W 24/04 |
| 2018/0279204 | A1* | 9/2018 | Kim | H04W 48/02 |
| 2019/0150221 | A1* | 5/2019 | Tseng | H04W 76/27 |
| | | | | 370/331 |
| 2019/0350033 | A1* | 11/2019 | Wu | H04W 76/27 |
| 2019/0380128 | A1* | 12/2019 | Park | H04W 88/10 |
| 2020/0015074 | A1* | 1/2020 | Kim | H04W 12/108 |
| 2020/0053821 | A1* | 2/2020 | Shih | H04W 76/27 |
| 2020/0059884 | A1* | 2/2020 | Chen | H04W 4/02 |
| 2020/0113015 | A1* | 4/2020 | Basu Mallick | H04W 4/46 |
| 2021/0314822 | A1* | 10/2021 | Li | H04W 36/08 |

OTHER PUBLICATIONS

3GPP TSG-RAN2 Meeting #103bis R2-1815993; Title: CR to 38.331 on stop T390 and related UE actions; Source to WG: Ericsson; Source to TSG: RAN2; Work item Code: NR_newRAT-Core; Date and Location: Oct. 8-12, 2018, Chengdu, China, consisting of 11-pages.

ETSI TS 124 501 V15.1.0; 5G; Non-Access-Stratum (NAS) protocol for 5G System (5GS); Stage 3 (3GPP TS 24.501 version 15.1.0 Release 15), Oct. 2018, consisting of 406-pages.

ETSI TS 136 331 V15.3.0; 5G; LTE; Evolved Universal Terrestrial Radio Access (E-UTRA); Radio Resource Control (RRC); Protocol specification (3GPP TS 36.331 version 15.3.0 Release 15), Oct. 2018, consisting of 916-pages.

* cited by examiner

RADIO NETWORK AREA UPDATE IN A WIRELESS COMMUNICATION SYSTEM

CROSS-REFERENCE TO RELATED APPLICATIONS

This application is a Submission Under 35 U.S.C. § 371 for U.S. National Stage Patent Application of International Application No.: PCT/SE2019/051102, filed Oct. 31, 2019 entitled "RADIO NETWORK AREA UPDATE IN A WIRELESS COMMUNICATION SYSTEM," which claims priority to U.S. Provisional Application No. 62/754,507, filed Nov. 1, 2018, the entireties of both of which are incorporated herein by reference.

TECHNICAL FIELD

The present application relates generally to a wireless communication system, and relates more particularly to radio network area update in such a wireless communication system.

BACKGROUND

A new radio resource control (RRC) state has been added for New Radio (NR) wireless communication systems to complement the existing states, RRC Idle and RRC connected. The new state is RRC Inactive. Similar to RRC Idle, the user equipment (UE) performs cell-reselection based on measurements of reference signals without providing the network with measurement reports. Additionally, when the network needs to reach the UE, the network pages the UE which in turn performs a random access (RA) to connect to the network. However, unlike RRC idle, the UE and the network in RRC Inactive maintain configurations obtained in RRC Connected state related to e.g. access-stratum (AS) context, security, and radio bearers. This way, the UE can resume its old configurations without much delay. In addition, the radio access network (RAN) can maintain the interface to the core network (CN), further reducing the resumption latency. Since the UE resumption from RRC Inactive to RRC connected state assumes that the old UE context can be reused, whichever cell the UE has re-selected must be able to retrieve the context from the old cell. If the context fetch fails, the network can instruct the UE to perform a RRC Connection Setup similar to the one performed from RRC idle state.

Since the RAN/CN connection can be maintained in RRC inactive state, the CN will assume that the UE is in ECM_CONNECTED (connected mode). Whenever the network needs to reach the UE, e.g. when there is downlink (DL) data available, the network will need to page the UE, as the RRC connection is suspended. However, as the CN assumes that the UE is in connected mode, the CN cannot initiate the page, but rather the RAN will have to initiate the notification. To facilitate a more efficient paging scheme, the RAN can assign a limited area, covering one or more cells, within which the UE can be paged by the RAN. This area is referred to as a radio network area or RAN-based notification area, RNA. While the UE moves within this RNA, it may not need to update the network of its location (at least if no periodic refresh is required in the meantime). When the UE moves outside its current RNA, it will have to update the network of its new location and be assigned a modified RNA. As the RNA can be smaller than the CN Tracking Area, the RAN paging message can be sent out in a smaller number of cells than in a typical CN paging procedure.

Although performing RNA updates enables a UE to remain in RRC inactive state and quickly resume its RRC connection even as the UE moves throughout the network, the RNA updates threaten the processing load and power consumption of the UE. But ensuring RNA updates are performed when needed and avoided when possible proves challenging, especially when taking into account that the network itself may not allow a UE to perform RNA updates under some circumstances (e.g., network overloading).

SUMMARY

According to some embodiments, a wireless device cancels or postpones a pending radio network area (RNA) update under certain circumstances. For example, the wireless device may cancel or postpone a pending RNA update when performance of the RNA update is triggered while the wireless device is in an out-of-coverage state, e.g., which would prevent performance of the RNA update from succeeding anyway. In some embodiments, for instance, the wireless device cancels or postpones a pending RNA update when access barring for an access category of the wireless device is alleviated (e.g., triggering performance of the pending RNA update) while the wireless device is in an out-of-coverage state. On the other hand, if access barring is alleviated while the wireless device is in an in-coverage state, the wireless device may indeed perform the pending RNA update.

Some embodiments thereby avoid performing an RNA update when the out-of-coverage state of the wireless device would have anyway prevented the update from succeeding. In this way, then, some embodiments advantageously avoid unnecessary control signalling and radio resource loading, as well as conserve device power consumption and device processing resources.

More particularly, some embodiments herein include a method performed by a wireless device for controlling radio network area, RNA, update. The method may comprise entering an out-of-coverage state while the wireless device is in a radio resource control, RRC, inactive state. The method may also comprise, responsive to access barring for an access category of the wireless device being alleviated while the wireless device is in the out-of-coverage state, canceling or postponing a pending RNA update.

In some embodiments, canceling or postponing the pending RNA update comprises canceling the pending RNA update. In one such embodiment, the method further comprises, responsive to access barring for an access category of the wireless device being alleviated while the wireless device is in the out-of-coverage state, transitioning from the RRC inactive state to an RRC idle state or triggering non-access stratum, NAS, signaling connection recovery.

In other embodiments, canceling or postponing the pending RNA update comprises postponing the pending RNA update, e.g., until the wireless device enters an in-coverage state. In one such embodiment, the method further comprises, responsive to access barring for an access category of the wireless device being alleviated while the wireless device is in the out-of-coverage state, remaining in the RRC inactive state.

In some embodiments, the method further comprises transmitting signaling from an access stratum layer at the wireless device towards a non-access stratum, NAS, layer at the wireless device. The signaling may indicate one or more of: (i) that access barring for an access category of the wireless device is alleviated; (ii) that the wireless device is to transition or has transitioned from the RRC inactive state to an RRC idle state; and (iii) that an RRC connection resume procedure has failed or that an RNA update procedure has failed. In one such embodiment, the method further comprises, responsive to receipt of the signaling at an upper layer that is above the access stratum layer in a protocol stack at the wireless device, controlling, by the upper layer, the wireless device to: (i) transition from a connected mode with an RRC inactive indication to an idle mode; and/or (ii) initiate a registration procedure for NAS signaling connection recovery.

In some embodiments, the out-of-coverage state is an any cell selection state or a camped on any cell state.

In some embodiments, the method further comprises determining that access barring for an access category of the wireless device is alleviated responsive to any of one or more timers expiring or stopping. The one or more timers include one or more of: (i) a wait timer that is started upon reception of an RRC reject message while performing RRC connection establishment or resume and that is stopped upon entering an RRC connected mode and upon cell re-selection; or (ii) a barring timer that is started when an access attempt is barred at access barring check for an access category of the wireless device.

In some embodiments, the access category is associated with RNA update. Embodiments herein also include corresponding apparatus, computer programs, and carriers such as non-transitory computer-readable mediums. For example, embodiments include a wireless device for controlling radio network area, RNA, update. The wireless device is configured (e.g., via communication circuitry and processing circuitry) to: (i) enter an out-of-coverage state while the wireless device is in a radio resource control, RRC, inactive state; and (ii) responsive to access barring for an access category of the wireless device being alleviated while the wireless device is in the out-of-coverage state, cancel or postpone a pending RNA update.

DETAILED DESCRIPTION

Figure 1:
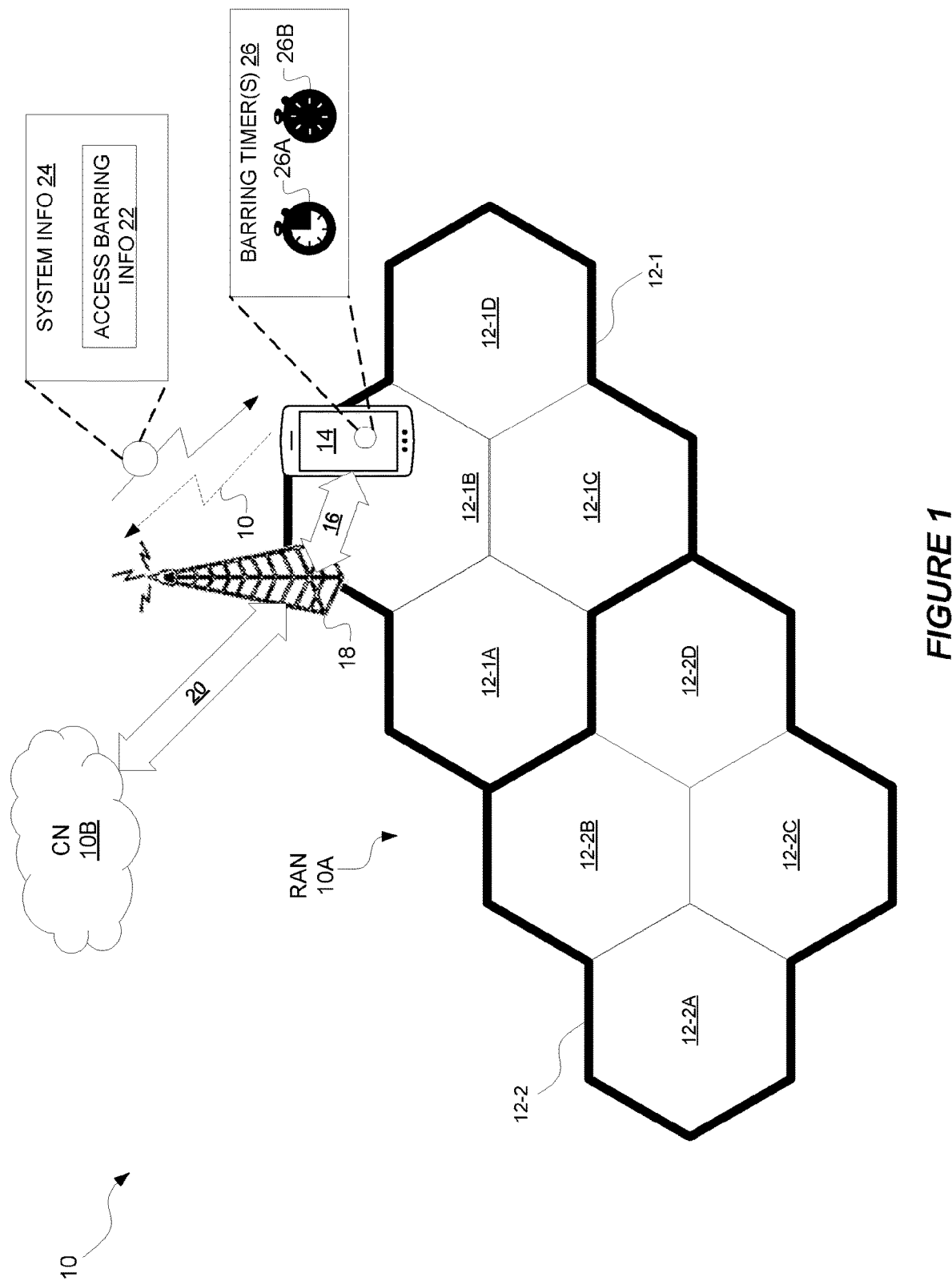
FIG. 1 is a block diagram of a wireless communication system according to some embodiments.

FIG. 1 shows a wireless communication system 10 according to some embodiments. The system 10 includes a radio access network (RAN) 10A that provides radio access to one or more wireless devices, one of which is shown as wireless device 14. Wireless devices wirelessly communicate with the RAN 10A for connecting to a core network (CN) 10B of the system 10. The core network 10B may in turn connect to one or more data networks (e.g., the Internet).

The wireless device 14 is configured to operate in one of multiple different possible radio resource control (RRC) states, including an RRC connected state, an RRC idle state, and/or an RRC inactive state. In the RRC connected state, the wireless device maintains an RRC connection 16 with the RAN 10A, e.g., at a serving radio network node 18 in the RAN 10A. The RAN 10A in turn maintains a connection 20 to the CN 10B for the wireless device 14. In the RRC idle state, by contrast, the RRC connection 16 and RAN-CN connection 20 are released. In the RRC inactive state, the RRC connection 16 is suspended, but the RAN-CN connection 20 may be maintained. Suspension of the RRC connection 16 may mean that configurations obtained in the RRC connected state, e.g., related to an access-stratum (AS) context, security context, radio bearers, etc. are preserved, so that the configurations may be resumed without re-establishing them from scratch.

To facilitate efficient paging for wireless devices in the RRC inactive state, the RAN 10A is divided into radio network areas, RNAs, also referred to as RAN-based notification areas, two of which are shown as RNA 12-1 and RNA 12-2. Each RNA includes one or more cells. For example, RNA 12-1 includes cells 12-1A, 12-1B, 12-1C, and 12-1D, whereas RNA 12-2 includes cells 12-2A, 12-2B, 12-2C, and 12-2D. While the wireless device 14 remains within any given RNA in the RRC inactive state, the wireless device 14 need not notify the RAN 10A of its location as the wireless device moves from cell to cell, e.g., at least not until a periodic update is required from time to time. When the wireless device 14 moves outside that RNA, the wireless device 14 must perform an RNA update to update the RAN 10A of the new RNA in which it is located. The wireless device 14 in this regard may transmit control signaling 10 to perform the RNA update, where for instance the control signaling 10 may take the form of an RRC connection resume request with a cause value set to indicate RNA update. In any event, with the RNA updated, the RAN 10A can initiate paging of the wireless device 14 if and when needed, e.g., for downlink data transfer.

The RAN 10A may nonetheless not allow the wireless device 14 to perform an RNA update under some circumstances, e.g., due to RAN overloading. Where for instance the wireless device 14 performs an RNA update by transmitting an RRC connection resume request with a cause value set to indicate RNA update, the RAN 10A may reject such a resume request. Alternatively or additionally, the RAN 10A may proactively transmit access barring information 22 (e.g., within system information 24) that indicates an access category of the wireless device 14 is barred from accessing the system 10.

In either case, whether due to explicit reject or due to access barring, the wireless device 14 may consider itself (or its access category) as barred. If the wireless device 14 is supposed to perform an RNA update (i.e., an RNA update has been "triggered") (e.g., due to moving to a new RNA or upon expiration of a periodic RNA update timer), but the RAN 10A does not allow (i.e., bars) such an RNA update at the moment, the wireless device 14 deems an RNA update as pending. The wireless device 14 may in this case set a state of the wireless device 14 to indicate an RNA update is pending (e.g., setting a variable pendingRnaUpdate=true). And, the wireless device 14 may set one or more barring timers 26 at the wireless device 14 to time when barring may be alleviated. For example, an RRC reject message may indicate the value that the wireless device 14 is to set a wait timer 26A (also referred to as timer T302), with barring being alleviated upon expiry of that wait timer 26A. Alternatively or additionally, the access barring information 22 may indicate the value that the wireless device 14 is to set a barring timer 26B (also referred to as a T390 timer), with barring being alleviated upon expiry of that barring timer 26B. Once barring is alleviated, the pending nature of the RNA update may suggest that the wireless device 14 should again attempt to perform the RNA update.

According to some embodiments herein, the wireless device 14 nonetheless cancels or postpones the pending RNA update under certain circumstances, i.e., even though barring is alleviated. In particular, according to some embodiments, the wireless device 14 cancels or postpones the pending RNA update if or when access barring (for an access category of the wireless device 14) is alleviated while the wireless device is in an out-of-coverage state.

An out-of-coverage state is a state in which the wireless device 14 is out of the coverage of a selected wireless communication system or network (e.g., a selected public land mobile network, PLMN). For example, in an out-of-coverage state the wireless device 14 is unable to find a suitable cell of the selected PLMN to camp on. Possible out-of-coverage states may include for instance an "any cell selection state" and/or a "camped on any cell state". Here, the "any cell selection state" may be a state in which the wireless device 14 attempts to find an acceptable cell of any PLMN to camp on, e.g., trying all radio access technologies (RATs) that are supported by the wireless device 14. The "camped on any cell state" may be a state in which the wireless device 14 has found and camped on such an acceptable cell, e.g., but meanwhile attempts to find a suitable cell of the selected PLMN. In these and other cases, then, an out-of-coverage state may be distinguished from an in-coverage state in which the wireless device is in the coverage of the selected PLMN.

In some embodiments, the out-of-coverage state of the wireless device 14 would prevent performance of the RNA update from succeeding anyway. Some embodiments thereby avoid performing an RNA update when the out-of-coverage state of the wireless device 14 would have anyway prevented the update from succeeding. In this way, then, some embodiments advantageously avoid unnecessary control signalling and radio resource loading, as well as conserve device power consumption and device processing resources.

In one or more embodiments, then, the wireless device 14, responsive to detecting that access barring is alleviated, initiates a pending RNA update, or cancels or postpones the pending RNA update, depending respectively on whether the wireless device 14 is in an in-coverage state or an out-of-coverage state.

In embodiments where the wireless device 14 postpones the pending RNA update, the wireless device 14 may postpone that update until the wireless device 14 enters an in-coverage state. In these and other cases, the wireless device 14 may also remain in the RRC inactive state, e.g., during or for the duration of the postponement.

In embodiments where the wireless device 14 cancels the pending RNA update, the wireless device 14 may for instance do so by setting a state of the wireless device 14 to indicate an RNA update is no longer pending (e.g., setting a variable pendingRnaUpdate=false). In these and other embodiments, the wireless device 14 may also transition from the RRC inactive state to the RRC idle state. Alternatively or additionally, the wireless device 14 may trigger non-access stratum (NAS) signaling connection recovery.

In some embodiments, the wireless device's functioning in this regard is facilitated by signalling from an AS layer at the wireless device 14 towards a NAS layer at the wireless device 14. The AS-to-NAS signalling may for instance indicate one or more of: (i) that access barring for an access category of the wireless device is alleviated; (ii) that the wireless device is to transition or has transitioned from the RRC inactive state to an RRC idle state; and (iii) that an RRC connection resume procedure has failed or that an RNA update procedure has failed. Responsive to receipt of this signaling at an upper layer (e.g., a NAS layer) above the AS layer at the wireless device 14, the upper lay may control the wireless device 14 to transition from a connected mode (e.g., a 5GMM-CONNECTED mode) with an RRC inactive indication to an idle mode (e.g., a 5GMM-IDLE mode) and/or initiate a registration procedure for NAS signaling connection recovery.

Figure 2:
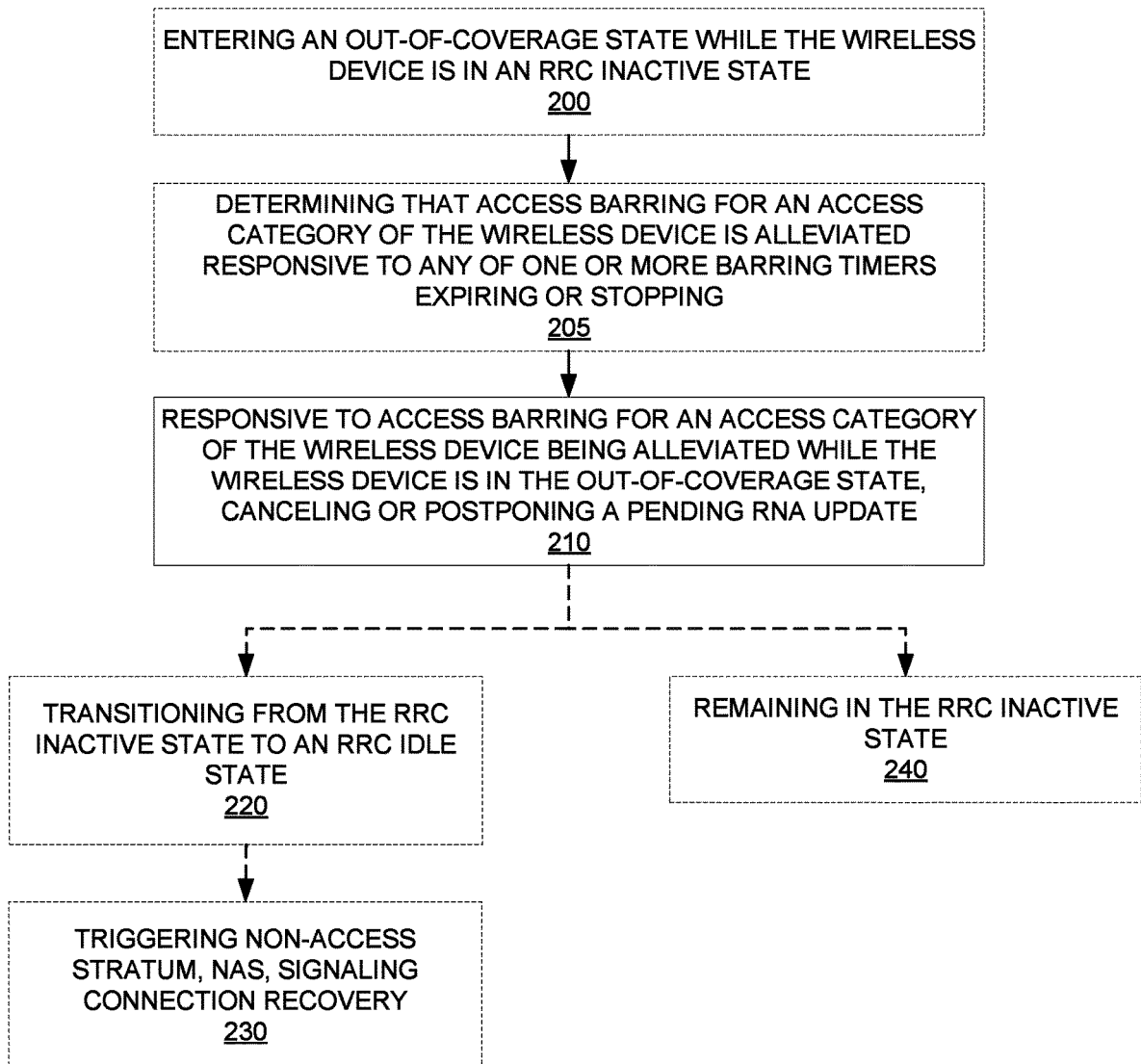
FIG. 2 is a logic flow diagram of a method performed by a wireless device for controlling radio network area, RNA, update in accordance with particular embodiments.

In view of the above variations and modifications, FIG. 2 depicts a method performed by a wireless device 14 for controlling radio network area, RNA, update in accordance with particular embodiments. The method may include entering an out-of-coverage state while the wireless device is in a radio resource control, RRC, inactive state (Block 200). The out-of-coverage state may for instance be a state in which the wireless device 14 has failed to find a suitable link (e.g., cell, beam, base station) of a selected wireless communication network (e.g., a selected PLMN). An out-of-coverage state may for instance include an any cell selection state in which the wireless device 14 attempts to find an acceptable link of any wireless communication network (and any supported RAT) to camp on. Alternatively or additionally, an out-of-coverage state includes a camped on any cell state in which the wireless device 14 finds and camps on such an acceptable link.

Regardless, the method as shown also includes, responsive to access barring for an access category of the wireless device 14 being alleviated while the wireless device 14 is in the out-of-coverage state, canceling or postponing a pending RNA update (e.g., a pending RAN-based notification area, RNA, update) (Block 210). The pending RNA update may be pending in the sense that it is a RNA update which has been previously triggered (e.g., due to expiry of a periodic RNA update timer) but has not yet been performed or accomplished (e.g., the RNA update was rejected or barred) since its (initial) triggering.

In one example, canceling or postponing the pending RNA update may include canceling the pending RNA update. In this case, although not shown, the method may further include, in addition to canceling the pending RNA update responsive to the access barring being alleviated while the wireless device 14 is in the out-of-coverage state, transiting from the RRC inactive state to an RRC idle state (Block 220) and/or triggering non-access stratum, NAS, signaling connection recovery (Block 230). In other embodiments, though, the pending RNA update may be simply postponed (e.g., until the wireless device enters an in-coverage state) instead of canceled. In this case, although not shown, the method may further include, in addition to canceling the pending RNA update response to the access barring being alleviated while the wireless device 14 is in the out-of-coverage state, remaining in the RRC inactive state (Block 240).

In some embodiments, the method may further include determining that access barring for an access category of the wireless device 14 is alleviated responsive to any of one or more barring timers 26 expiring or stopping (Block 205). The one or more barring timers 26 may include for instance a timer 26A (e.g., a T302 timer) that is started upon reception of an RRC reject message while performing RRC connection establishment or resume and that is stopped upon entering an RRC connected mode and upon cell re-selection. Alternatively or additionally, the one or more barring timers 26 may include a timer 26B (e.g., a T390 timer) that is started when an access attempt is barred at access barring check for an access category of the wireless device 14.

Although not shown, the method in some embodiments further comprises transmitting signalling from an AS layer at the wireless device 14 towards a NAS layer at the wireless device 14. The AS-to-NAS signalling may for instance indicate one or more of: (i) that access barring for an access category of the wireless device 14 is alleviated; (ii) that the wireless device 14 is to transition or has transitioned from the RRC inactive state to an RRC idle state; and (iii) that an RRC connection resume procedure has failed or that an RNA update procedure has failed. Responsive to receipt of this signaling at an upper layer (e.g., a NAS layer) above the AS layer at the wireless device 14, the method may comprise controlling, by the upper layer, the wireless device 14 to transition from a connected mode (e.g., a 5GMM-CONNECTED mode) with an RRC inactive indication to an idle mode (e.g., a 5GMM-IDLE mode) and/or initiate a registration procedure for NAS signaling connection recovery.

Alternatively or additionally, the method may further comprise, before entering the out-of-coverage state, transmitting an RRC connection resume request to perform an RNA update, receiving an RRC reject message in response to the RRC connection resume request, and, responsive to receipt of the RRC reject message, starting a wait timer 26A and setting a state of the wireless device 14 to indicate that an RNA update is pending.

Alternatively or additionally, the method may further comprise, before said entering the out-of-coverage state, receiving broadcasted system information 24 that indicates an access category of the wireless device 14 is barred, and, responsive to barring of the access category of the wireless device 14, starting a barring timer 26B and setting a state of the wireless device 14 to indicate that an RNA update is pending.

Figure 3:
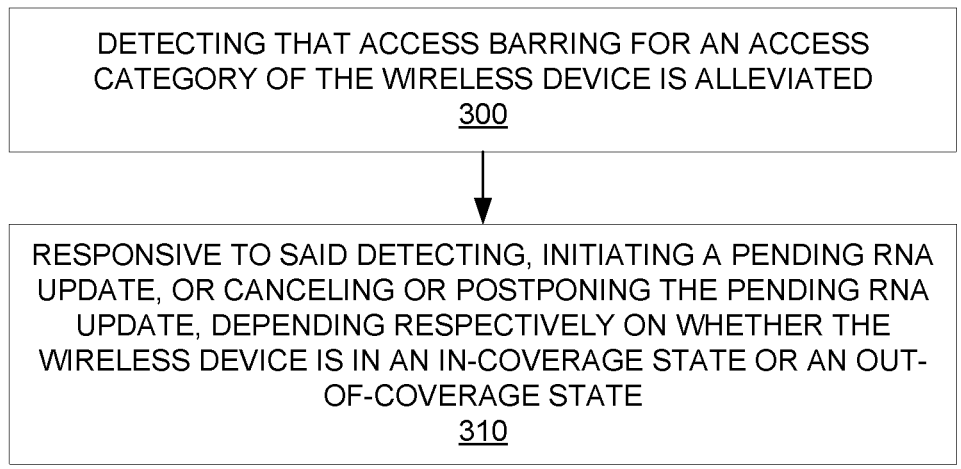
FIG. 3 is a logic flow diagram of a method performed by a wireless device for radio network area, RNA, update in accordance with other particular embodiments.

FIG. 3 depicts a method performed by a wireless device 14 for radio network area, RNA, update in accordance with other particular embodiments. The method includes detecting that access barring for an access category of the wireless device 14 is alleviated (Block 300). The method also includes, responsive to said detecting, initiating a pending RNA update, or canceling or postponing the pending RNA update, depending respectively on whether the wireless device 14 is in an in-coverage state or an out-of-coverage state (Block 310).

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
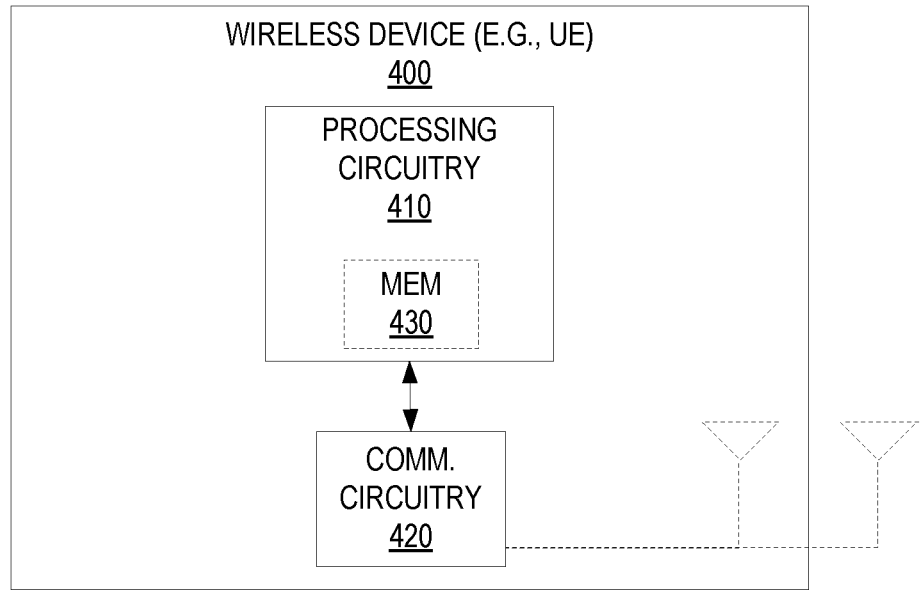
FIG. 4 is a block diagram of a wireless device according to some embodiments.

FIG. 4 for example illustrates a wireless device 400 (e.g., wireless device 14) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, e.g., in FIGS. 2 and/or 3, such as by executing instructions stored in memory 430. The processing circuitry 410 in this regard may implement certain functional means, units, or modules.

Figure 5:
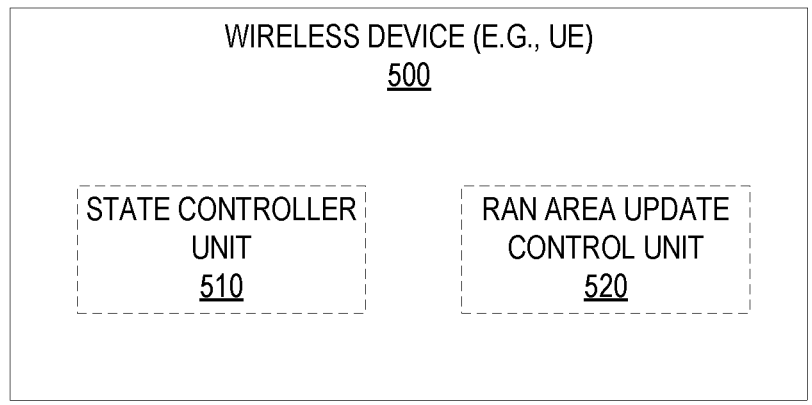
FIG. 5 is a block diagram of a wireless device according to other embodiments.
Figure 11:
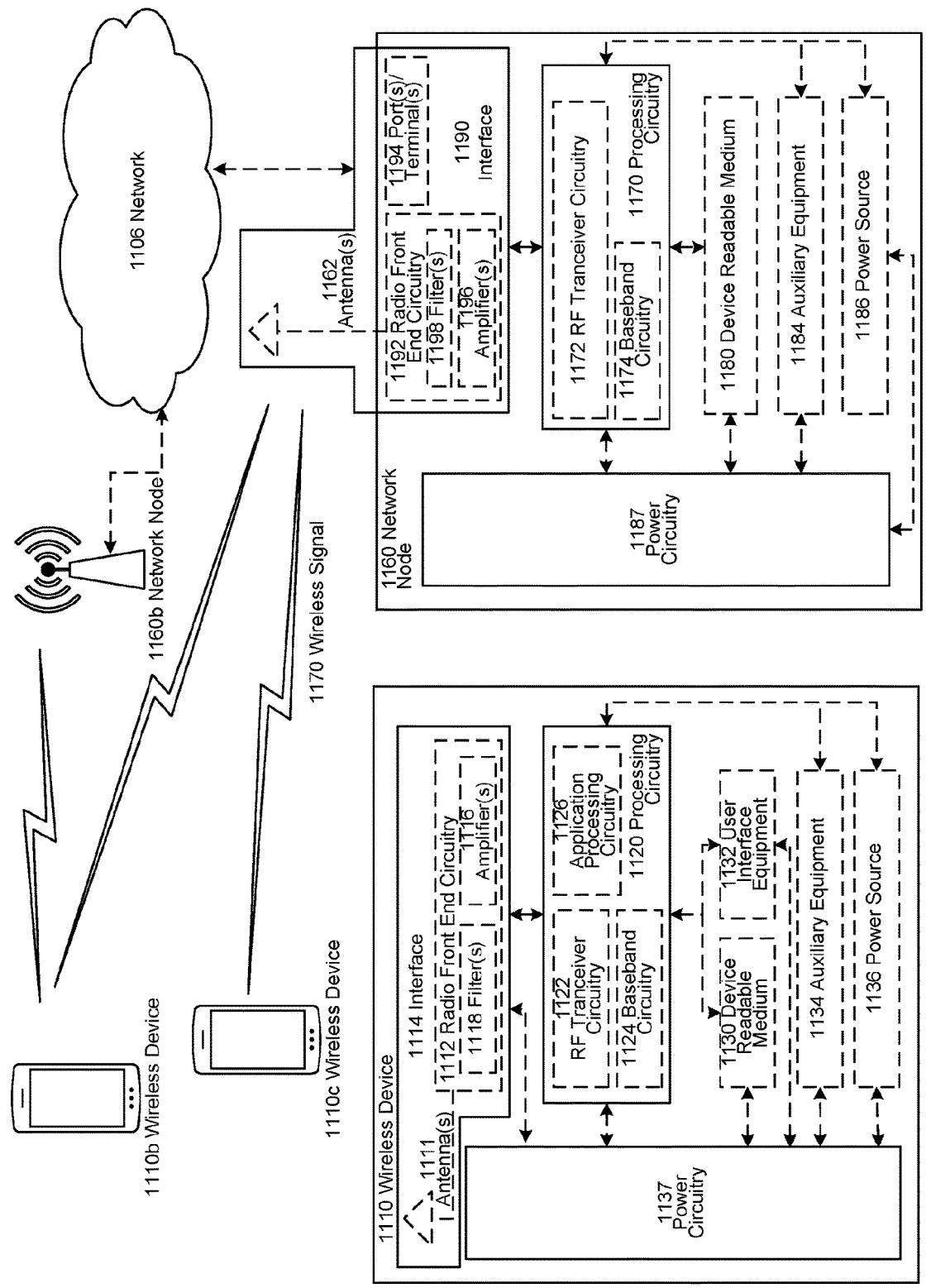
FIG. 11 is a block diagram of a wireless communication network according to some embodiments.

FIG. 5 illustrates a schematic block diagram of a wireless device 500 (e.g., wireless device 14) in a wireless network according to still other embodiments (for example, the wireless network shown in FIG. 11). As shown, the wireless device 500 implements various functional means, units, or modules, e.g., via the processing circuitry 410 in FIG. 4 and/or via software code. These functional means, units, or modules, e.g., for implementing the method(s) herein, include for instance a state controller unit 510 for controlling the wireless device 500 to enter an out-of-coverage state while the wireless device is in a radio resource control, RRC, inactive state. Also included is an RAN area update control unit 520 for, responsive to access barring for an access category of the wireless device being alleviated while the wireless device is in the out-of-coverage state, canceling or postponing a pending RAN area update.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a wireless device, cause the wireless device to perform as described above.

Embodiments further include a computer program product comprising program code portions for performing the steps of any of the embodiments herein when the computer program product is executed by a wireless device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The radio resource control (RRC) state model is updated in New Radio (NR) (and in eLTE, i.e. Long Term Evolution, LTE, connected to a 5G core, 5GC) to include a new RRC_INACTIVE state in addition to the existing RRC_IDLE and RRC_CONNECTED states inherited from LTE. In RRC_INACTIVE, the user equipment (UE) context from the previous RRC connection is stored in the radio access network (RAN) and is re-used the next time an RRC connection is established. The UE context includes information such as the UE security configuration, configured radio bearers etc. By storing the UE context in the RAN, one avoids the signaling required for security activation and bearer establishment which is normally required when transitioning from RRC_IDLE to RRC_CONNECTED. Furthermore, the last serving gNB keeps the UE-associated core network connection (i.e. the UE is in the so-called CM-CONNECTED state) while the UE is in RRC_INACTIVE. In this way, the core network connection does not need to be re-established when the connection is resumed. Together, this improves latency and reduces signaling overhead.

Figure 6:
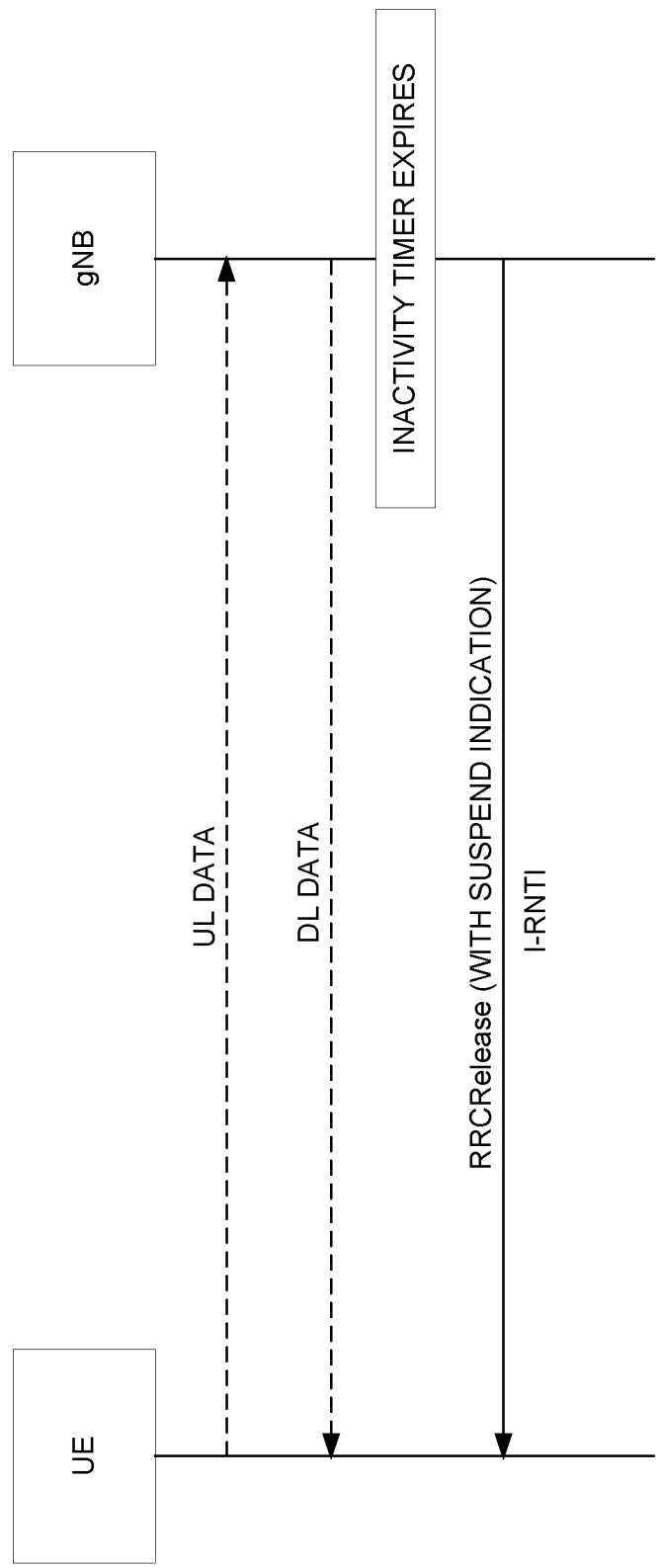
FIG. 6 is a call flow diagram of a procedure for suspending a radio resource control connection of a user equipment according to some embodiments.

RRC_INACTIVE mode is realized by introducing two new procedures: "RRC connection suspend" (also called RRC connection release with SuspendConfig) and "RRC connection resume". The gNB suspends a connection and moves the UE from RRC_CONNECTED to RRC_INACTIVE by sending a RRC release message with suspend indication (or configuration) to the UE, as shown in FIG. 6. This may happen for example after the UE has been inactive for a certain period which causes the gNB internal inactivity timer to expire. Both the UE and gNB stores the UE context and the associated identifier (referred to as I-RNTI, where RNTI stands for radio network temporary identifier). Two identifiers will be configured in the suspend configuration, a long and short I-RNTI. The one to be used in resume depends on an indication from the network in system information of the cell the UE tries to resume in. The two I-RNTI identifiers were introduced to support scenarios when the UE is resuming in a cell which only gives the UE a small scheduling grant for the first UL message. For this purpose, also two different resume messages have been introduced; namely, RRCResumeRequest and RRCResumeRequestl. RRC resume request as used herein refers to both messages.

Figure 7:
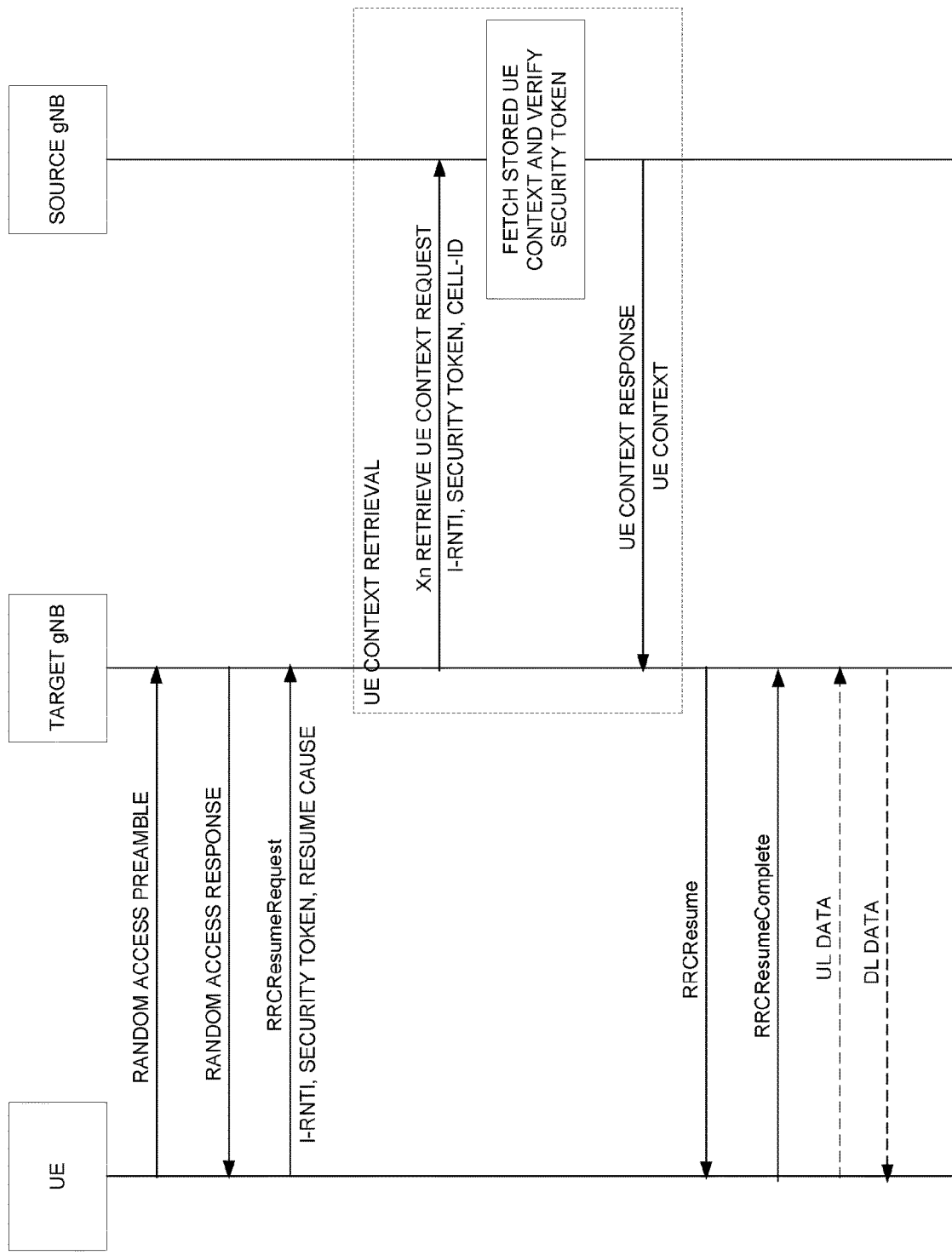
FIG. 7 is a call flow diagram of a procedure for resuming a radio resource control connection of a user equipment according to some embodiments.

As shown in FIG. 7, at the next transition to RRC_CONNECTED, the UE resumes the connection by sending a RRC resume request including the following information to the gNB which the UE attempts to resume the connection towards (note that it may be another cell/gNB compared to the cell/gNB where the connection was suspended): (i) the I-RNTI (either the long or short I-RNTI depending on the system information indication); (ii) a security token (which may be called resumeMAC-I) which is used to identify and verify the UE at RRC connection resume; and (iii) an indication of the cause of the resume, e.g. mobile originated data.

The gNB which serves the cell in which the UE is resuming is sometimes referred to as the target gNB, while the gNB serving the cell in which the UE was suspended in is sometimes referred to as the source gNB. To resume the connection, the target gNB determines which gNB is the source gNB (considering the gNB part of the I-RNTI) and requests that gNB to send the UE's context. In the request, the target provides, among other things, the UE ID and security token received from the UE as well as the target cell Cell ID.

The source gNB then locates the UE context based on the I-RNTI and verifies the request based on the security token. If successful, the gNB forwards the UE context to the target gNB, which then responds to the UE with RRC resume to confirm the connection is being resumed. Finally, the UE acknowledges the reception of the RRC re-establishment by sending RRC re-establishment complete.

Note that the RRC resume procedure works in a similar way in LTE and eLTE.

A UE in RRC_INACTIVE remains in CM-CONNECTED and can move within an area configured by RAN (e.g., referred to as a RAN-based notification area, RNA, in 5G) without notifying RAN. As described above, the last serving gNB keeps the UE context and the UE-associated NG connection with the serving access and mobility function (AMF) and user plane function (UPF).

If the last serving gNB receives downlink (DL) data from the UPF or DL UE-associated signalling from the AMF while the UE is in RRC_INACTIVE, it pages in the cells corresponding to the RNA and may send XnAP RAN Paging to neighbour gNB(s) if the RNA includes cells of neighbour gNB(s). If the UE moves outside the configured RNA or if the periodic RNA update timer expires, the UE will trigger the RNA update procedure to notify RAN of its presence.

A UE is considered out-of-coverage if it fails to find a suitable cell of the selected public land mobile network (PLMN) to camp on. When this happens, the UE enters "any cell selection" state where it will attempt to find an acceptable cell of any PLMN to camp on, trying all radio access technologies (RATs) that are supported by the UE. If an acceptable cell is found, the UE enters the "camped on any cell" state where it will be able to obtain limited service (e.g. initiate emergency calls and receive public warning notifications). A UE in camped on any cell state will regularly try to find a suitable cell of the selected PLMN to camp on. If such cell is found, the UE is said to be in camped normally state.

Out-of-coverage situations can occur even in well planned networks (the typical scenario is when the UE enters an elevator or a basement) but it would typically be highly temporary, and most likely, the UE will select a suitable cell in the same RAT (NR) or another RAT quickly. Therefore, the UE may remain in RRC_INACTIVE in the "any cell selection" or "camped on any cell" state. And, if the periodic RNA update timer expires while in these states, or if an access attempt is triggered by higher layers (e.g. to initiate an emergency call), the UE will immediately move to RRC_IDLE.

Regarding RRC_INACTIVE in out-of-coverage situations, (i) If the UE enters "Any cell selection" the UE remains in RRC_INACTIVE; and (ii) If the UE camps on an acceptable cell (i.e. "Camped on any cell" state) the UE remains in RRC_INACTIVE and then goes to IDLE when RNAU update timer expires or until the UE non-access stratum (NAS) initiates signalling (RRC also to be updated to ensure that RNAU is not triggered on acceptable cell).

Figure 8:
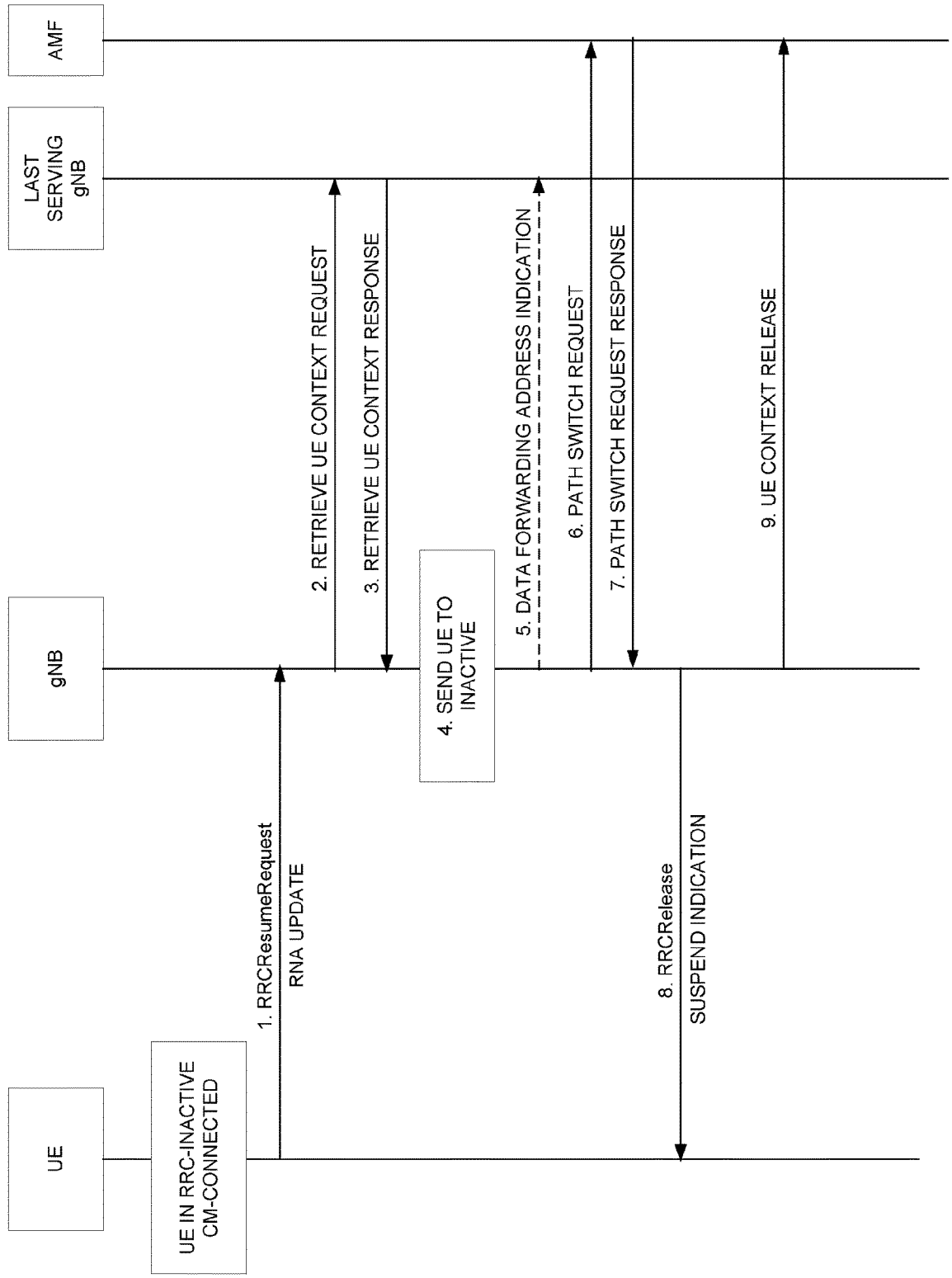
FIG. 8 is a call flow diagram of an RNA update procedure with UE context relocation according to some embodiments.

FIG. 8 describes the UE triggered RNA update procedure involving context retrieval over Xn, i.e., an RNU update procedure with UE context relocation. The procedure may be triggered when the UE moves out of the configured RNA, or at the expiry of a periodic RNA Update timer.

In Step 1, the UE resumes from RRC_INACTIVE, providing the I-RNTI allocated by the last serving gNB and appropriate cause value, e.g., RAN notification area update.

In Step 2, the gNB, if able to resolve the gNB identity contained in the I-RNTI, requests the last serving gNB to provide UE Context, providing the cause value received in step 1.

In Step 3, the last serving gNB provides UE context.

In Step 4, the gNB may move the UE to RRC_CONNECTED, or send the UE back to RRC_IDLE (in which case an RRCRelease message is sent by the gNB and the procedure ends), or send the UE back to RRC_INACTIVE as assumed in the following.

In Step 5, if loss of DL user data buffered in the last serving gNB shall be prevented, the gNB provides forwarding addresses.

In Step 6 and 7, the gNB performs path switch.

In Step 8, the gNB moves the UE back to RRC_INACTIVE state by sending RRCRelease with suspend indication.

In Step 9, the gNB triggers the release of the UE resources at the last serving gNB.

Figure 9:
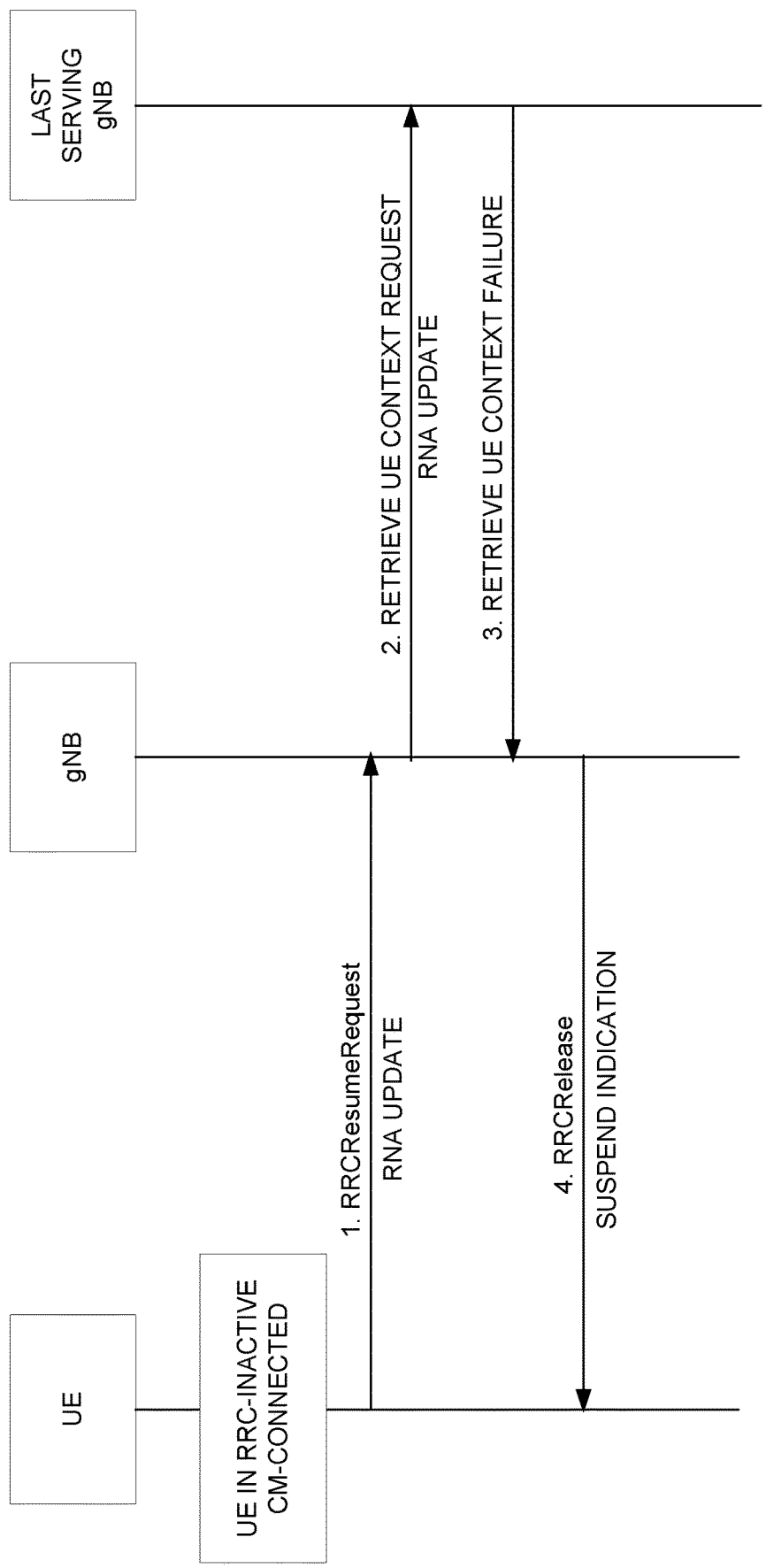
FIG. 9 is a call flow diagram of an RNA update procedure without UE context relocation according to some embodiments.

FIG. 9 describes the periodic RNA update procedure for the case when the last serving gNB decides not to relocate the UE context, i.e., an RNU update procedure without UE context relocation.

In Step 1, the UE resumes from RRC_INACTIVE, providing the I-RNTI allocated by the last serving gNB and appropriate cause value, e.g., RAN notification area update.

In Step 2, the gNB, if able to resolve the gNB identity contained in the I-RNTI, requests the last serving gNB to provide UE Context, providing the cause value received in step 1.

In Step 3, the last serving gNB responds to the gNB with the RETRIEVE UE CONTEXT FAILURE message including an encapsulated RRC Connection Release message. The RRC message includes suspend configuration, if the last serving gNB decides to keep the UE in RRC_INACTIVE.

In Step 4, the gNB forwards the RRC Connection Release message to the UE.

There currently exist certain challenge(s). As mentioned, an RRC_INACTIVE UE shall enter RRC_IDLE if the periodic RNA update timer expires when the UE is out-of-coverage, i.e. when the UE is in any cell selection or camped on acceptable cell state. However, RNA update may also be triggered due other reasons, for instance if the UE has a pending RNA update and barring is alleviated. This case is explained in more detail below.

An RNA update becomes pending if the network rejects an RNA update with a wait timer (referred to as the T302 timer) or if the network applies access barring and has chosen to temporarily bar RNA updates with a barring timer (referred to as the T390 timer). When barring is alleviated (i.e. T302 or T390 expires or are stopped), the UE will attempt RNA update once again.

This is currently captured in the RRC specification as follows. See R2-1815993, CR to 38.331 on stopping T390 and UE related actions, Ericsson, RAN2#103bis. If (i) timer T302 expires or is stopped, and if timer T390 corresponding to an Access Category is not running; or (ii) timer T390 corresponding to an Access Category expires or is stopped, and if timer T302 is not running, then the UE shall consider the barring for this Access Category to be alleviated. When barring for an access category is considered being alleviated, the UE shall inform upper layers about barring alleviation for the Access Category if the Access Category was provided upon access barring check requested by upper layers. And when barring for an access category is considered being alleviated, the UE shall perform certain specified actions as part of the RNA update procedure if barring is alleviated for Access Category [the standardised RAN specific access category (associated with RNA update)].

In particular, the certain specified actions that the UE shall perform are as follows. In RRC_INACTIVE state, if T380 expires or if upon cell reselection the UE enters an RNA not belonging to the configured ran-NotificationAreaInfo, the UE shall (i) initiate the RRC connection resume procedure with cause value set in accordance with the information received from upper layers if upper layers request resumption of an RRC connection; or (ii) initiate RRC connection resume procedure with cause value set to 'ma-Update' if upper layers do not request resumption of an RRC connection. And, in RRC_INACTIVE STATE, if barring is alleviated for Access Category [the standardised RAN specific access category], if upper layers do not request RRC the resumption of an RRC connection, and if the variable pendingRnaUpdate is set to 'TRUE', the UE shall set the variable pendingRnaUpdate to 'FALSE'.

As it can be seen, the current RRC specification text does not consider if the UE is in- or out-of-coverage when RNA update is triggered due to barring alleviation. Triggering RNA update when UE is out-of-coverage is unnecessary and should be avoided since the RNA update will anyway not succeed in this situation. This is because in that case the UE has either not found any acceptable cell to camp on (i.e. UE is in the any cell selection state) and hence it cannot send the RRC connection resume request required by the RNA update, or it is camped on an acceptable cell (i.e. UE is in the camped on any cell selection) but since the cell does not belong to the selected PLMN the serving gNB will not be able to retrieve the UE context which means the RNA update procedure will fail.

Certain aspects of the present disclosure and their embodiments may provide solutions to these or other challenges. Some embodiments for example avoid that RNA update is triggered when the UE has a pending RNA update and barring is alleviated while the UE is out-of-coverage.

Some embodiments in particular comprise a method for handling the triggering of an RNA update when the UE is out-of-coverage. The method comprises the following. If barring is alleviated (e.g., stop or expiry of T302 or T390) and the UE has a pending RNA update, the UE checks if it is in-coverage (i.e. in camped normally state) or out-of-coverage (i.e. in any cell selection or camped on any cell state). If the UE is in-coverage, the RNA update is triggered, otherwise the pending RNA update is cancelled.

In addition to cancelling the RNA update, the UE may also transition from RRC_INACTIVE to RRC_IDLE and trigger e.g. NAS recovery. That may be implemented in the specifications by informing upper layers of that type of failure (and subsequent actions on AS level, such as the transition from RRC_INACTIVE to RRC_IDLE) so that upper layers trigger the NAS recovery (i.e. a registration area procedure). Alternatively, the UE may remain in RRC_INACTIVE and instead of cancelling the RNA update the RNA update can be postponed until the UE has returned to in-coverage i.e. consider the RNAU procedure still pending and, initiated once UE gets back to coverage.

The method in some embodiments also comprises the access stratum (AS)/NAS interactions (indications from AS to NAS and NAS requests to AS) upon barring alleviation while UE is out-of-coverage. Upon barring alleviation while UE is out-of-coverage, the UE may for example perform the following actions: (i) AS indicates to upper layers (or NAS) that barring is alleviated for the associated access categories; (ii) AS indicates to upper layers (or NAS) that UE transitions from RRC_INACTIVE to RRC_IDLE; (iii) AS indicates to upper layers (or NAS) that RRC resume has failed; Or, alternatively, any indication that is more specific than a resume failure, such as a resume failure due to a failed RNA update; and (iv) Upon any combination of at least one of the abovementioned indications, upper layers trigger a transition from 5GMM-CONNECTED with inactive indication to 5GMM-IDLE and initiates NAS recovery (i.e. a registration area update procedure).

Another aspect covered by the method in some embodiments is the alignment between the indications from AS layer to upper layers when an RNA update failure occurs. As RNA update procedure is a special case of an RRC Resume procedure, the failure of an RNA update procedure is indicated as an RRC resume failure. However, in the existing NAS specifications, the NAS recovery is triggered when there is a failure in the transition from RRC_INACTIVE to RRC_CONNECTED. However, a successful RNA update (or, being more precise when RRC Resume is triggered by an RNA update conditions such as the expiry of timer T380 or barring alleviation while RNAU is pending or when UE enters a new RNA) may be the UE sending an RRC Resume Request and the network responding with an RRC Release, with or without a suspending indication, i.e., leading the UE to go to RRC_IDLE or to remain in RRC_INACTIVE. Hence, the resume failure due a failed RNA update attempt should not be interpreted as a failed attempt to move from RRC_INACTIVE to RRC_CONNECTED, since: (i) RRC_CONNECTED is not the typical target state for RNA updates, as the network would typically receive an RRC Release with suspend configuration; and (ii) the target state may RRC_INACTIVE, or RRC_IDLE or RRC_CONNECTED.

Then, according to some embodiments, upon detecting an RRC resume failure on AS level, the AS indicates to upper layers an RRC resume failure, which is not necessarily a failure on the transition from RRC_INACTIVE to RRC_CONNECTED. Similarly, the NAS layer expects an RRC Resume failure indication, and not only an indication that the transition from RRC_INACTIVE state to RRC_CONNECTED state has failed.

Certain embodiments may provide one or more of the following technical advantage(s). Some embodiments avoid that RNA update is triggered when the UE is out-of-coverage. Performing an RNA update when the UE is out-of-coverage is unnecessary since the procedure will anyway fail in this situation. Some embodiments have one or more of the following advantages: (i) avoids unnecessary signaling and the associated increase in power consumption and resource usage; (ii) avoids that UE served by one PLMN causes disturbance and generates signaling in some other unrelated PLMN (i.e. a PLMN which the serving PLMN does not have business relationship with); (iii) clarifies to upper layers that NAS recovery shall be triggered by providing an indication that UE transitions from RRC_INACTIVE to RRC_IDLE and that 'RRC Resume failure' has occurred; Otherwise, the upper layers only get an information that should lead to a NAS transition from 5GMM-CONNECTED with inactive indication to 5GMM-CONNECTED.

Figure 10:
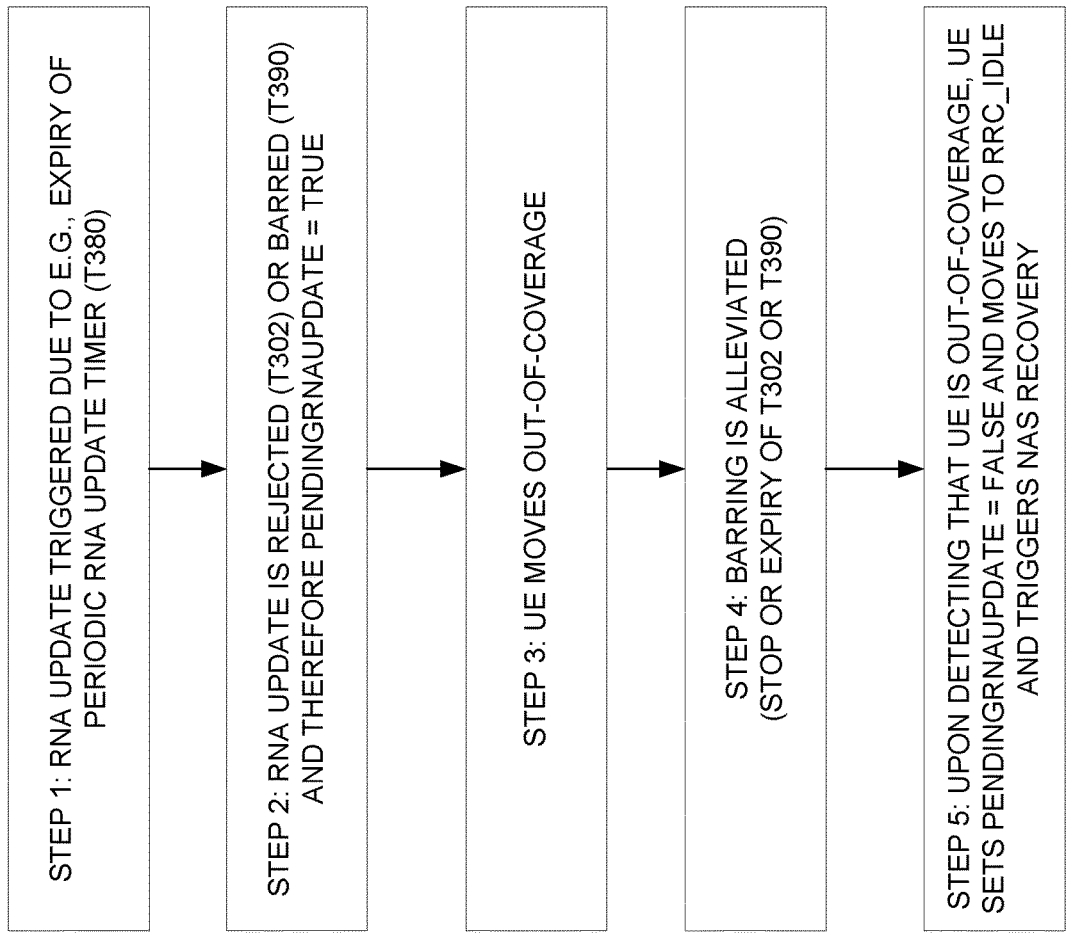
FIG. 10 is a logic flow diagram of a method performed on by a user equipment according to some embodiments for cancelling a pending RNA update when the user equipment is out-of-coverage.

FIG. 10 shows a method performed on the UE side according to some embodiments for cancelling a pending RNA update when UE is out-of-coverage. As shown, a UE is in RRC_INACTIVE and RNA update is triggered due to e.g. expiry of the periodic RNA update timer (Step 1). When the RNA update procedure is initiated, the RRC resume request is either rejected by the network or the UE detects that (the access category associated with the) RNA update is barred in the broadcasted system information (Step 2). In the former case, the UE starts the wait timer (T302) with the value provided in the reject message received from the network and in the latter case the UE starts the barring timer (T390) with a value determined according to the broadcasted barring information. As the RNA update is rejected/barred, the UE considers the RNA update as pending by setting the variable pendingRNAUpdate to 'TRUE'.

Due to e.g. UE mobility, the UE moves out-of-coverage, i.e. the UE moves from the camped normally state to the any cell selection or camped on any cell state (Step 3). At some later point, barring is alleviated when the wait timer (T302) or barring timer (T390) expires or is stopped (Step 4). As an RNA update is pending, this will cause the UE to again trigger RNA update.

Before performing an RNA update triggered due to barring alleviation, the UE checks if it is in- or out-of-coverage. If the UE is in-coverage (i.e. in camped normally state) the RNA update is initiated, otherwise, if the UE is out-of-coverage, as is the case shown in FIG. 10, the pending RNA update is cancelled (pendingRnaUpdate is set to 'False') and the UE moves from RRC_INACTIVE to RRC_IDLE state and triggers e.g. NAS recovery (Step 5). Alternatively, instead of cancelling the pending RNA update and moving to RRC_IDLE state, the UE can remain in RRC_INACTIVE state and postpone the RNA update until it comes back into coverage.

Consider one possible implementation of some embodiments in the 3GPP RRC specifications (e.g. TS 38.331 for NR specifications), as shown below:
RNA Update
Upon entering RRC_INACTIVE state, except when the UE is in "any cell selection state" or "camped on acceptable cell state", the UE shall:
1> if T380 expires; or
1> if upon cell reselection the UE enters an RNA not belonging to the configured ran-NotificationAreaInfo:
2> if upper layers request resumption of an RRC connection;
3> initiate RRC connection resume procedure in 5.3.13.2 with cause value set in accordance with the information received from upper layers;
2> else:
3> initiate RRC connection resume procedure in 5.3.13.2 with cause value set to 'ma-Update';
1> if barring is alleviated for Access Category [the standardised RAN specific access category], as specified in 5.3.14.4:
2> if upper layers do not request RRC the resumption of an RRC connection, and
2> if the variable pendingRnaUpdate is set to 'TRUE':
3> set the variable pendingRnaUpdate to 'FALSE';
3> initiate RRC connection resume procedure in 5.3.13.2 with cause value set to 'ma-Update'.
Upon entering "any cell selection state" or "camped on acceptable cell state" while in RRC_INACTIVE state, the UE shall:
1> if T380 expires while the UE is in "any cell selection state"; or
1> if barring is alleviated for Access Category [the standardised RAN specific access category], as specified in 5.3.14.4, while the UE is in "any cell selection state" or "camped on acceptable cell state";
2> set the variable pendingRnaUpdate to 'FALSE'; and
2> perform the actions upon going to RRC_IDLE as specified in 5.3.11 with release cause 'RRC Resume failure'.

Consider also a possible implementation of some embodiments in 3GPP NAS specifications (e.g. TS 24.501 v15.1.0 for 5GC specifications). In particular, concerning 5GMM-CONNECTED mode with RRC inactive indication, the UE shall transition from 5GMM-CONNECTED mode with RRC inactive indication to 5GMM-IDLE mode over 3GPP access and initiate the registration procedure for mobility and periodic registration update used for mobility (i.e. the 5GS registration type IE set to "mobility registration updating" in the REGISTRATION REQUEST message) for NAS signalling connection recovery as specified in subclause 5.5.1.3.2 of TS 24.501 v15.1.0, upon receiving from the lower layers: (a) indication that the RRC Resume procedure has failed; or (b) fallback indication without resume request from NAS.

Consider now an alternative implementation of some embodiments that postpone RNA update. In this implementation, a new condition may be added to 5.3.13.8 as:
Upon returning to "camped normally state" from "any cell selection state" or "camped on acceptable cell state" while in RRC_INACTIVE state, the UE shall:
1> if the variable pendingRnaUpdate is set 'TRUE':
2> initiate RRC connection resume procedure in 5.3.13.2 with cause value set to 'ma-Update';

Note that although some embodiments are described the context of NR, other embodiments extend also to eLTE.

Note further that the exemplary NR embodiments described above may be generalized such that an RNA may be generalized to a RAN area according to any type of wireless communication network, and an RNA update may be generalized to any RAN area update according to any type of wireless communication network.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
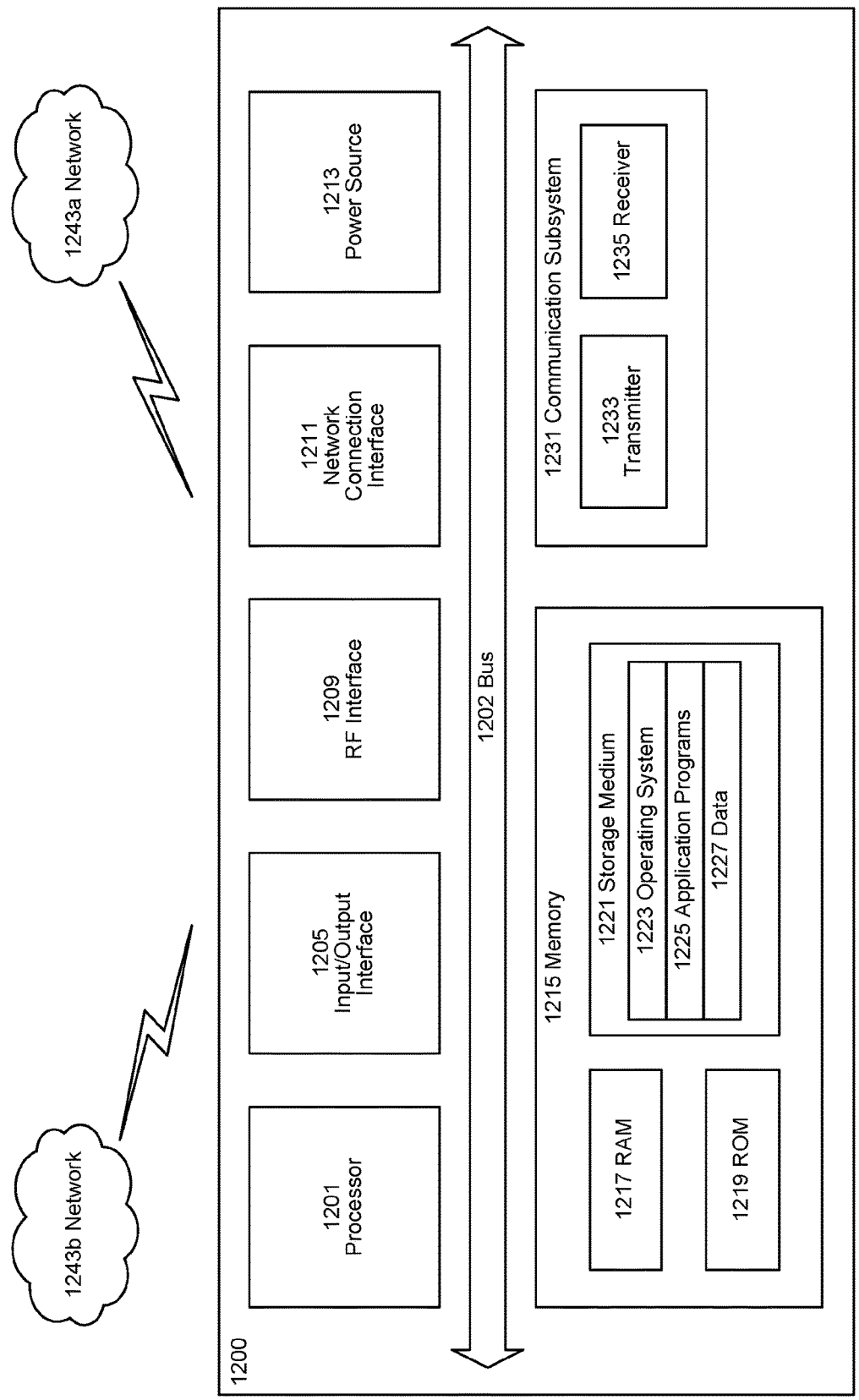
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{ed}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
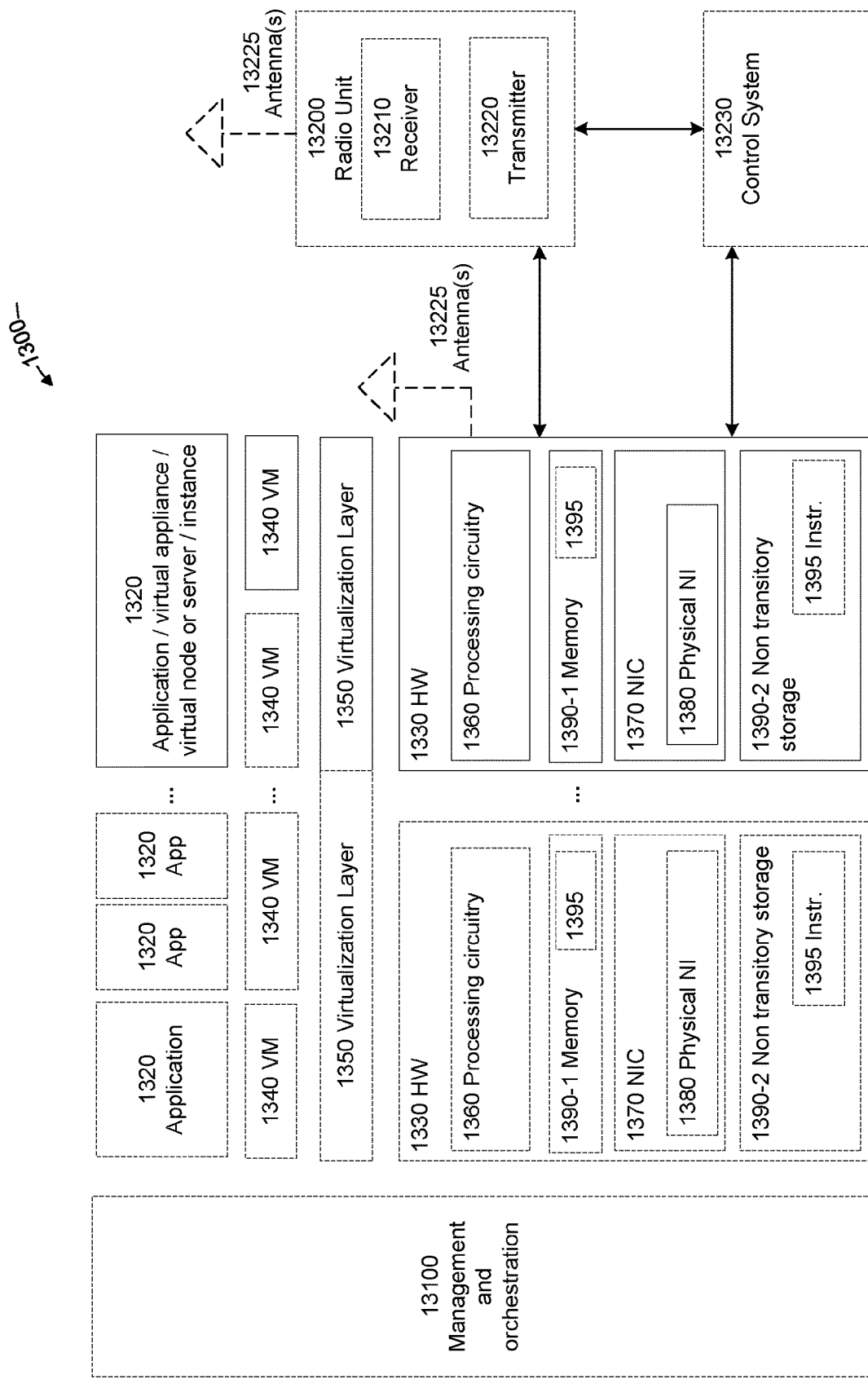
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
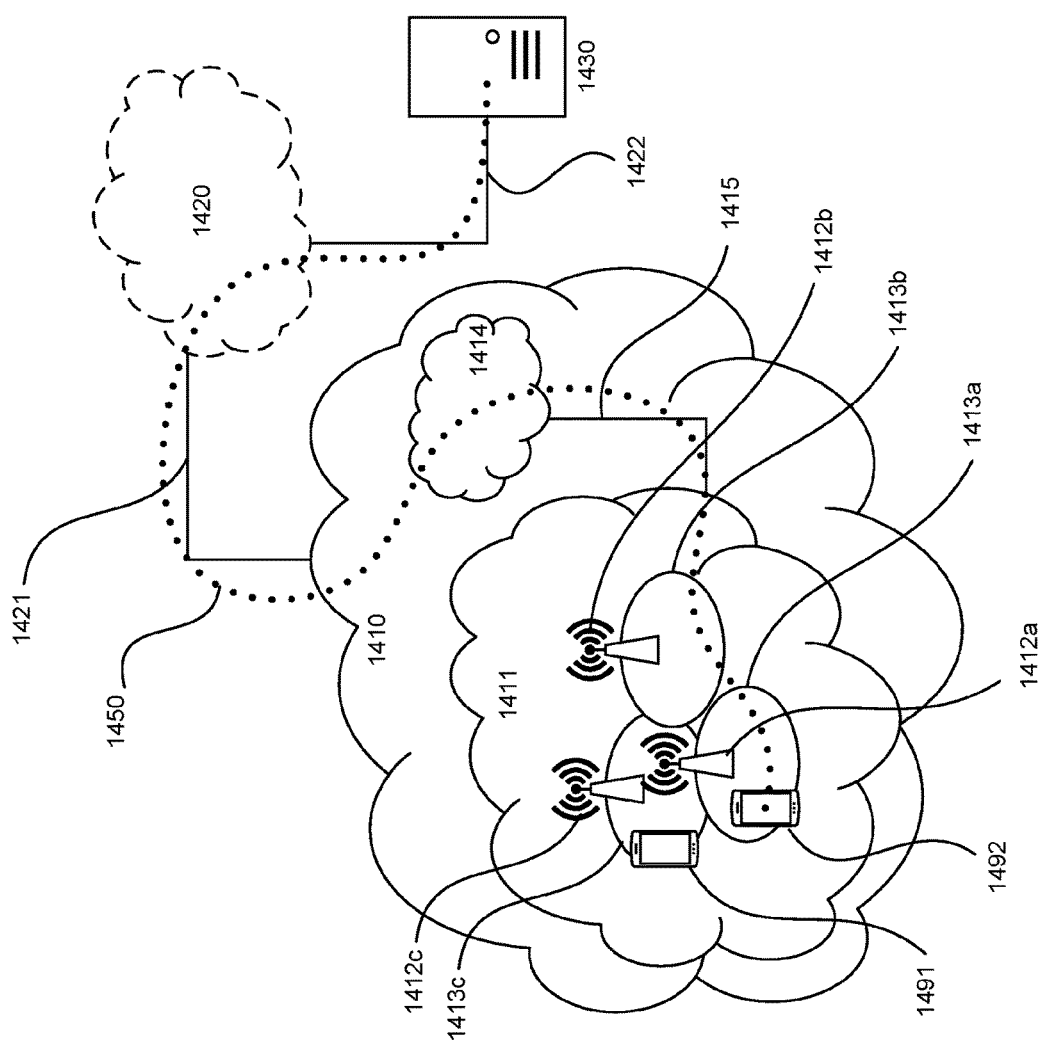
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
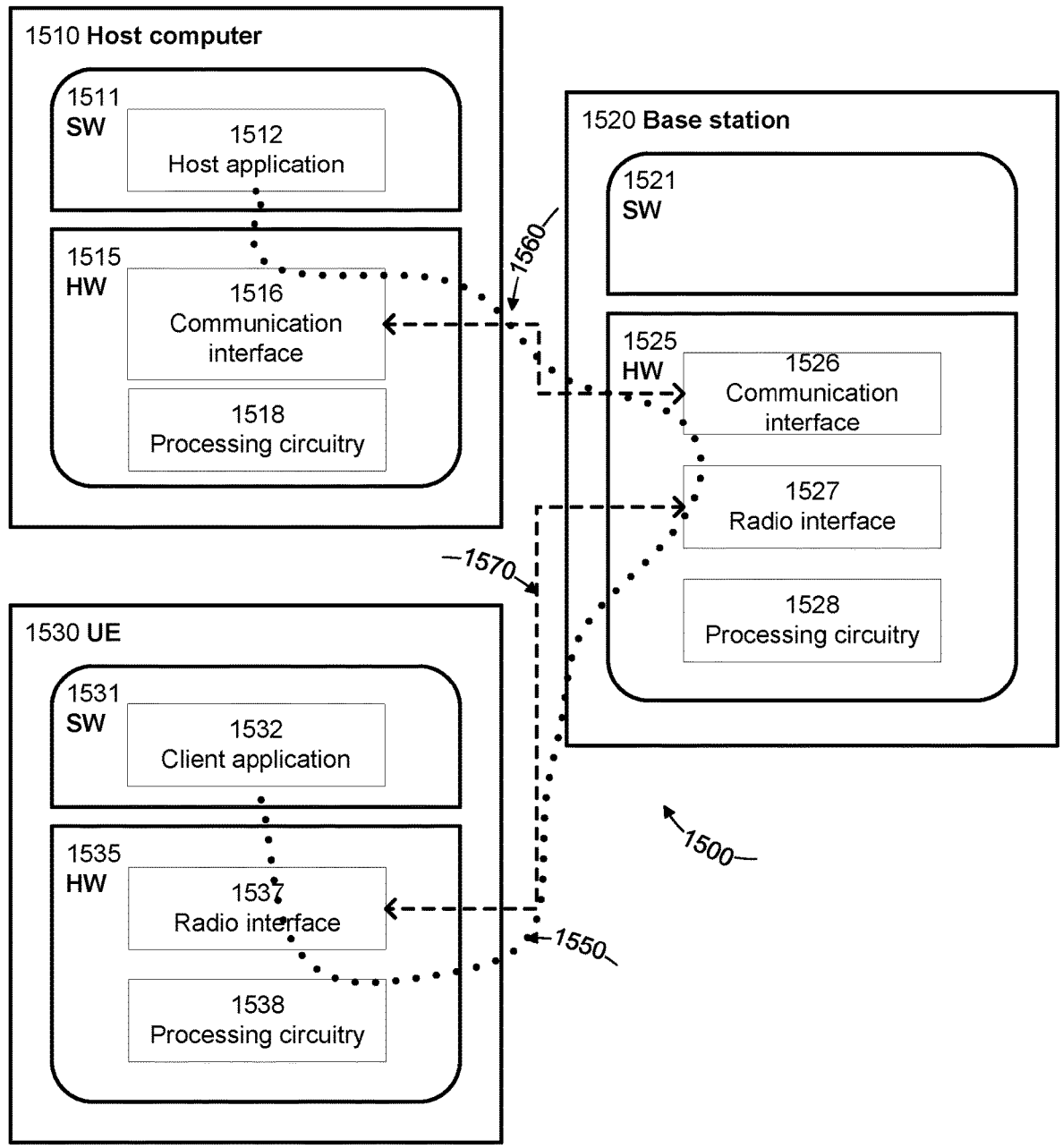
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the signaling overhead, power consumption, resource usage, and/or PLMN disturbance and thereby provide benefits such as higher throughput and/or greater system capacity, reduced user waiting time, relaxed restriction of file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
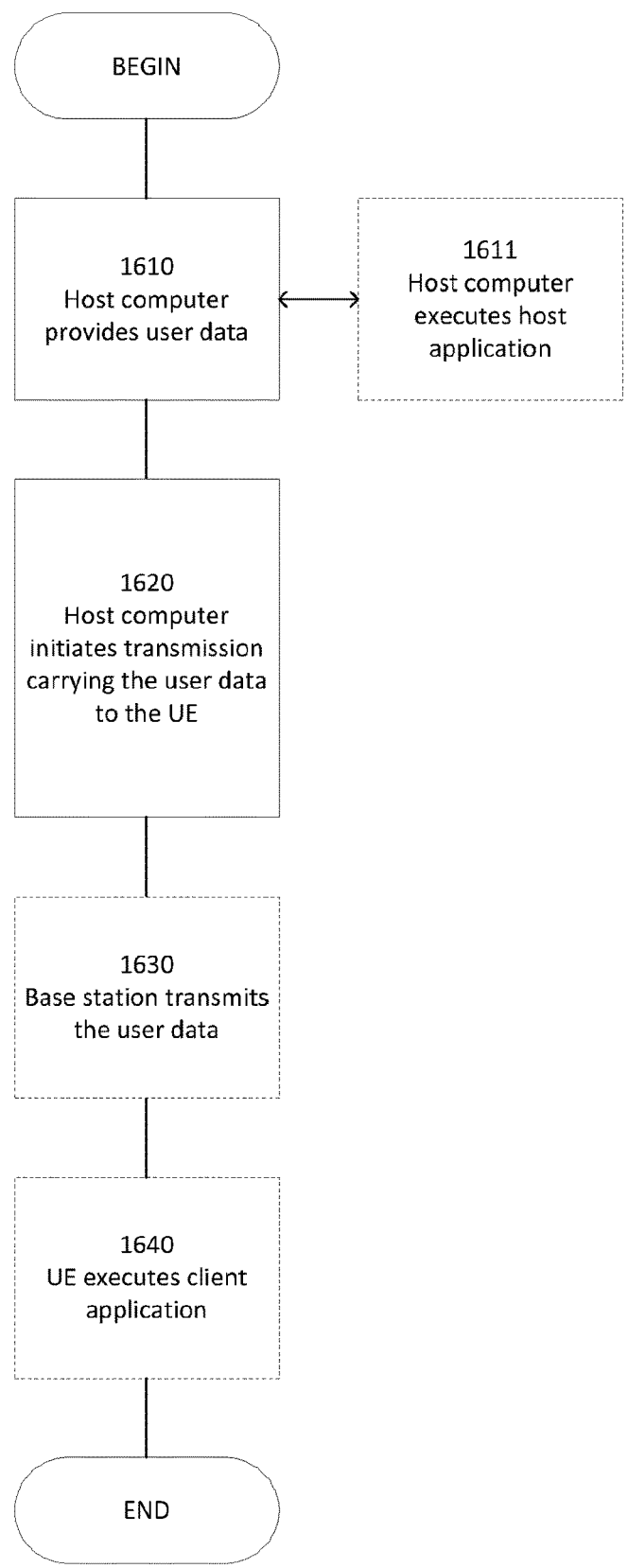
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional)

of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
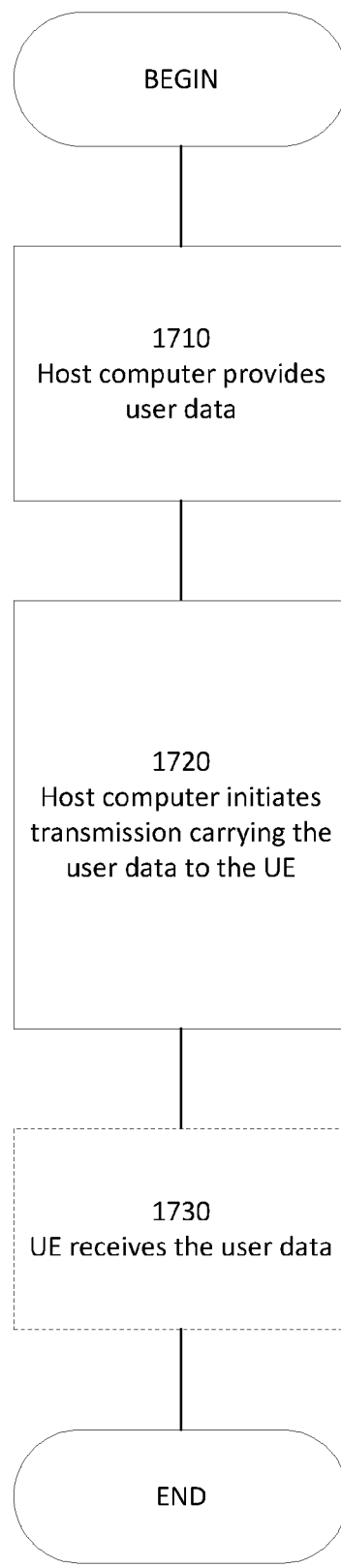
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
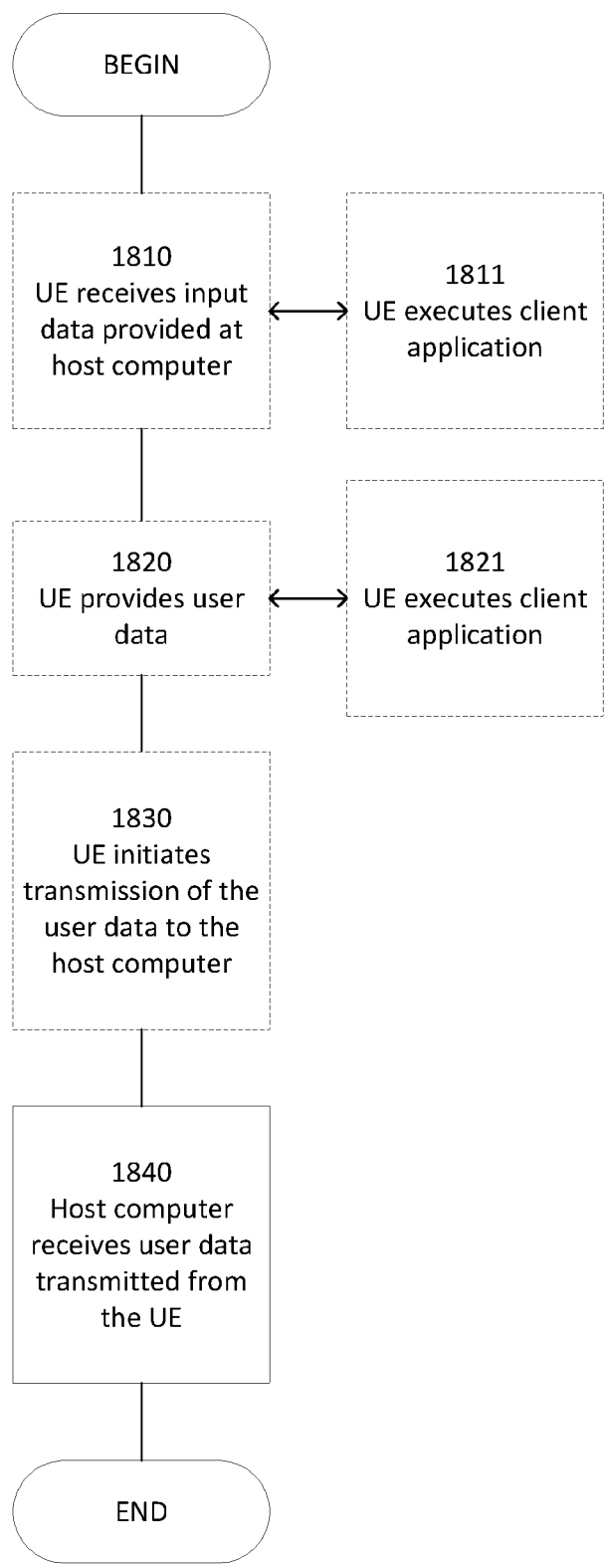
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
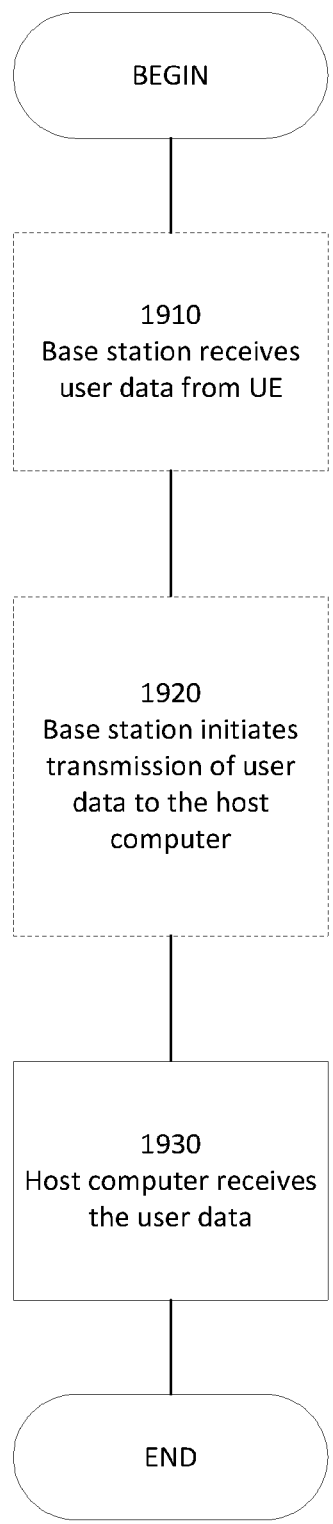
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device for controlling radio network area, RNA, update, the method comprising:

entering an out-of-coverage state while the wireless device is in a radio resource control, RRC, inactive state;

responsive to access barring for an access category of the wireless device being alleviated while the wireless device is in the out-of-coverage state, one of canceling and postponing a pending RNA update; and transmitting signaling from an access stratum layer at the wireless device towards a non-access stratum, NAS, layer at the wireless device, the signaling indicating one or more of:

that access barring for an access category of the wireless device is alleviated;

that the wireless device is one of to be transitioned and has transitioned from the RRC inactive state to an RRC idle state; and one of that an RRC connection resume procedure has failed and that an RNA update procedure has failed.

2. The method of claim 1, wherein the one of the canceling and postponing the pending RNA update comprises canceling the pending RNA update.

3. The method of claim 2, further comprising, responsive to access barring for an access category of the wireless device being alleviated while the wireless device is in the out-of-coverage state, transitioning from the RRC inactive state to an RRC idle state or triggering non-access stratum, NAS, signaling connection recovery.

4. The method of claim 2, further comprising, responsive to receipt of the signaling at an upper layer that is above the access stratum layer in a protocol stack at the wireless device, controlling, by the upper layer, the wireless device to at least one of:

transition from a connected mode with an RRC inactive indication to an idle mode; and initiate a registration procedure for NAS signaling connection recovery.

5. The method of claim 2, wherein the out-of-coverage state is one of an any cell selection state and a camped on any cell state.

6. The method of claim 2, further comprising determining that access barring for an access category of the wireless device is alleviated responsive to any of one or more timers expiring or stopping, wherein the one or more timers include one or more of:

a wait timer that is started upon reception of an RRC reject message while performing one of RRC connection establishment and resume and that is stopped upon entering an RRC connected mode and upon cell re-selection; and a barring timer that is started when an access attempt is barred at access barring check for an access category of the wireless device.

7. The method of claim 2, wherein the access category is associated with RNA update.

8. The method of claim 1, wherein the one of the canceling and postponing the pending RNA update comprises postponing the pending RNA update.

9. The method of claim 8, further comprising, responsive to access barring for an access category of the wireless device being alleviated while the wireless device is in the out-of-coverage state, remaining in the RRC inactive state.

10. The method of claim 8, wherein postponing the pending RNA update comprises postponing the pending RNA update until the wireless device enters an in-coverage state.

11. The method of claim 10, further comprising, responsive to access barring for an access category of the wireless device being alleviated while the wireless device is in the out-of-coverage state, remaining in the RRC inactive state.

12. The method of claim 1, further comprising, responsive to receipt of the signaling at an upper layer that is above the access stratum layer in a protocol stack at the wireless device, controlling, by the upper layer, the wireless device to at least one of:

transition from a connected mode with an RRC inactive indication to an idle mode; and initiate a registration procedure for NAS signaling connection recovery.

13. The method of claim 1, wherein the out-of-coverage state is one of an any cell selection state and a camped on any cell state.

14. The method of claim 1, further comprising determining that access barring for an access category of the wireless device is alleviated responsive to any of one or more timers expiring or stopping, wherein the one or more timers include one or more of:

a wait timer that is started upon reception of an RRC reject message while performing one of RRC connection establishment and resume and that is stopped upon entering an RRC connected mode and upon cell re-selection; and a barring timer that is started when an access attempt is barred at access barring check for an access category of the wireless device.

15. The method of claim 1, wherein the access category is associated with RNA update.

16. A non-transitory computer-readable medium storing a computer program comprising instructions which, when executed by at least one processor of a wireless device, causes the wireless device to perform a method for controlling radio network area, RNA, update, the method comprising:

entering an out-of-coverage state while the wireless device is in a radio resource control, RRC, inactive state;

responsive to access barring for an access category of the wireless device being alleviated while the wireless device is in the out-of-coverage state, one of canceling and postponing a pending RNA update; and transmitting signaling from an access stratum layer at the wireless device towards a non-access stratum, NAS, layer at the wireless device, the signaling indicating one or more of:

that access barring for an access category of the wireless device is alleviated;

that the wireless device is one of to be transitioned and has transitioned from the RRC inactive state to an RRC idle state; and one of that an RRC connection resume procedure has failed and that an RNA update procedure has failed.

17. A wireless device for controlling radio network area, RNA, update, the wireless device comprising:

communication circuitry; and processing circuitry configured to:

enter an out-of-coverage state while the wireless device is in a radio resource control, RRC, inactive state;

responsive to access barring for an access category of the wireless device being alleviated while the wireless device is in the out-of-coverage state, one of cancel and postpone a pending RNA update; and transmit signaling from an access stratum layer at the wireless device towards a non-access stratum, NAS, layer at the wireless device, the signaling indicating one or more of:

that access barring for an access category of the wireless device is alleviated:
that the wireless device is one of to be transitioned and has transitioned from the RRC inactive state to an RRC idle state; and
one of that an RRC connection resume procedure has failed and that an RNA update procedure has failed.

18. The wireless device of claim 17, wherein the one of the canceling and postponing the pending RNA update comprises canceling the pending RNA update.

\* \* \* \* \*